June 27, 1967 TATSUO SAKAMOTO ET AL 3,328,561
ELECTRIC COOKING APPARATUS HAVING THERMOMAGNETIC
TEMPERATURE CONTROL MEANS
Filed Oct. 29, 1963 9 Sheets-Sheet 1
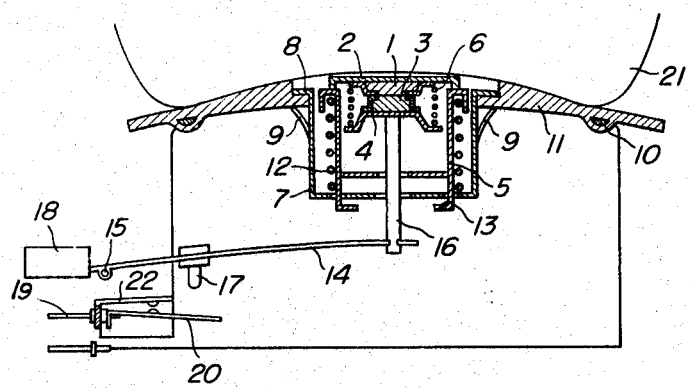
Fig. 1
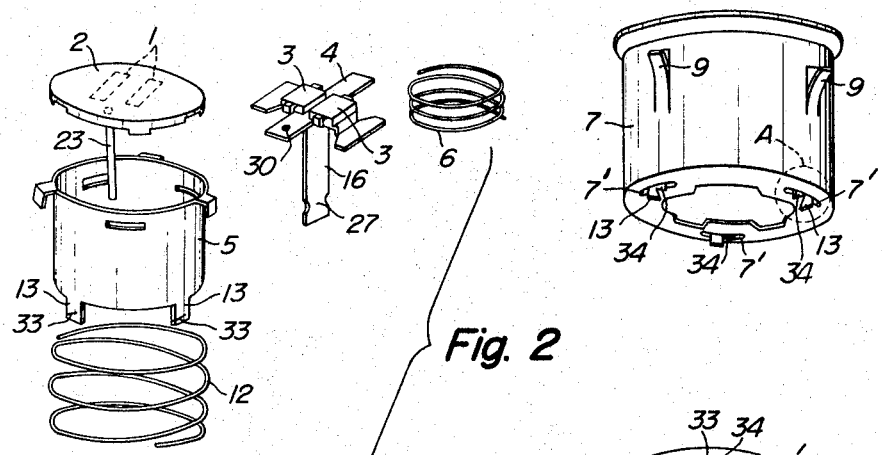
Fig. 2
Fig. 3
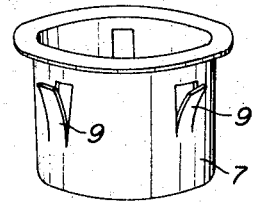
Fig. 4a
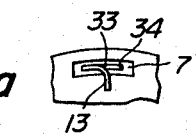
Fig. 4b
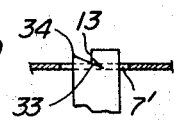
INVENTORS
TATSUO SAKAMOTO
YOSHIAKI SANO
ATTORNEYS

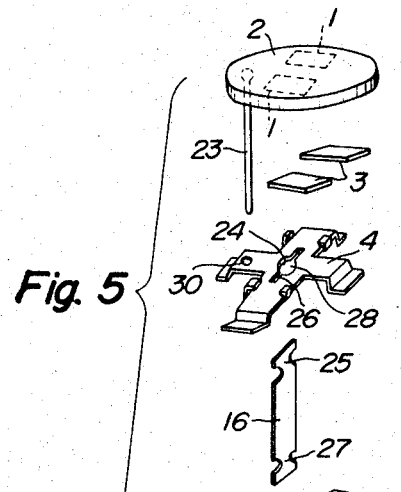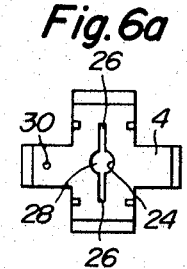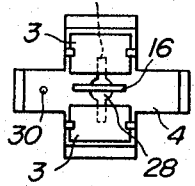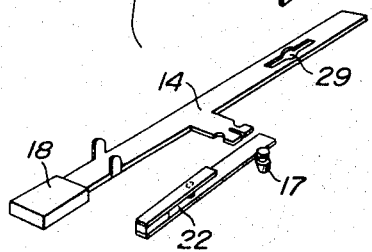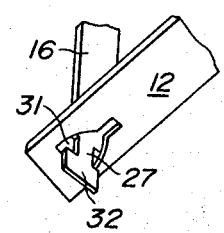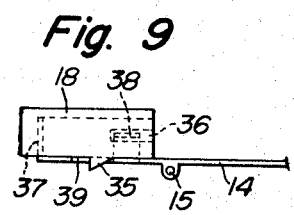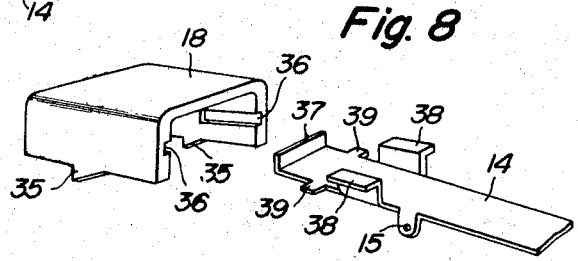

June 27, 1967  TATSUO SAKAMOTO ET AL  3,328,561
ELECTRIC COOKING APPARATUS HAVING THERMOMAGNETIC
TEMPERATURE CONTROL MEANS
Filed Oct. 29, 1963  9 Sheets-Sheet 3

INVENTORS
TATSUO SAKAMOTO
YOSHIAKI SANO
By Stevens, Davis, Miller & Mosher
ATTORNEYS June 27, 1967    TATSUO SAKAMOTO ET AL    3,328,561
ELECTRIC COOKING APPARATUS HAVING THERMOMAGNETIC
TEMPERATURE CONTROL MEANS Filed Oct. 29, 1963                              9 Sheets-Sheet 5

INVENTORS
TATSUO SAKAMOTO
YOSHIAKI SANO
By Stevens, Davis, Miller + Mosher
ATTORNEYS

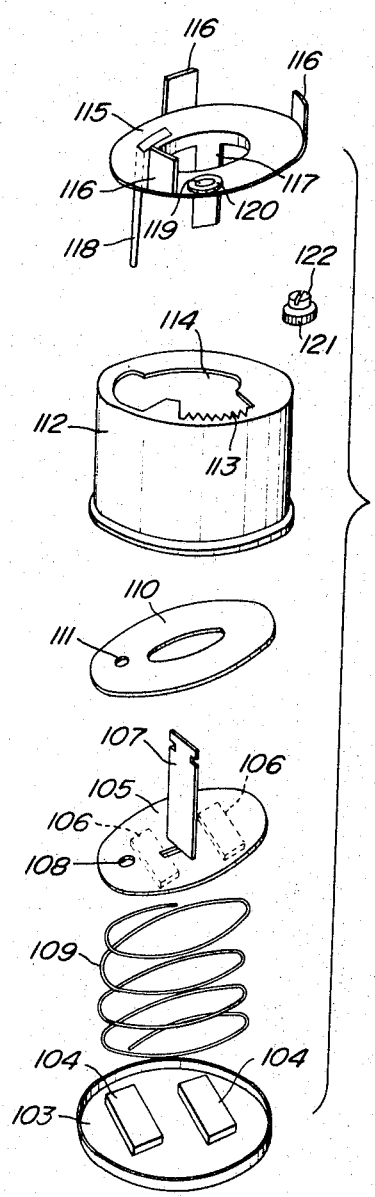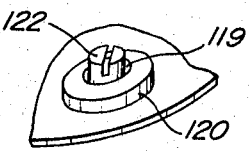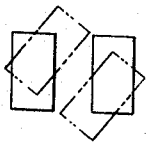

June 27, 1967  TATSUO SAKAMOTO ET AL  3,328,561
ELECTRIC COOKING APPARATUS HAVING THERMOMAGNETIC
TEMPERATURE CONTROL MEANS
Filed Oct. 29, 1963  9 Sheets-Sheet 9

INVENTORS
TATSUO SAKAMOTO
YOSHIAKI SANO
By Stevens, Davis, Miller & Mosher
ATTORNEYS

United States Patent Office 3,328,561
Patented June 27, 1967

3,328,561
ELECTRIC COOKING APPARATUS HAVING THERMOMAGNETIC TEMPERATURE CONTROL MEANS
Tatsuo Sakamoto, Minoo-shi, and Yoshiaki Sano, Kobe, Japan, assignors to Matsushita Electric Industrial Co., Ltd., Osaka, Japan, a corporation of Japan
Filed Oct. 29, 1963, Ser. No. 319,748
Claims priority, application Japan, May 7, 1963, 38/24,495; June 13, 1963, 38/31,890 (utility model) 38/45,120 (utility model) 38/45,121
10 Claims. (Cl. 219—442)

The present invention relates to cooking apparatus such as rice cooking pots, percolators, and egg cookers, and more particularly to heat-actuated devices adapted for such cooking apparatus.

In cooking apparatus such as those described above, the temperature at the end of one cooking cycle must be positively detected so that contacts in the heater circuit can be instantaneously opened. The contact opening temperature must be easily regulated in order that the food can be cooked satisfactorily. In the case of a rice cooking pot, for example, the heater circuit thereof must be opened as soon as the cooking of rice is completed to prevent the rice from scorching. If the heater circuit should open before the rice is fully cooked, the boiled rice would be soft and watery although there would be no scorching. Therefore, the heater circuit must be opened as soon as the boiling of rice has been completed. It is apparent that this requirement is not solely limited to the rice cooking pot, but applicable to any cooking apparatus.

In the case of an egg cooker, the heater circuit must be opened instantaneously at a desired temperature in order to obtain eggs of a desired hardness. Otherwise, hard-boiled eggs will be obtained instead of soft-boiled eggs, and vice versa. It is therefore obvious that the capability of instantaneous opening of the heater circuit has a direct relation with the hardness of the eggs.

Further, in a percolator, water boiled in a lower vessel is supplied to an upper vessel and subsequently heating of the lower vessel is stopped. Hot water is then drawn downwardly by negative pressure produced in the lower vessel, and coffee is percolated by the hot water during its downward flow. In this case, the heater circuit must also be instantaneously opened as soon as the lower vessel is emptied since successive heating would result in a danger, for example, of explosion.

As described above, the timing of opening of the heater circuit is deeply related with the degree of cooking attained by the cooking apparatus. That is, instantaneous and rapid opening of the heater circuit is required as soon as the cooking is completed in an apparatus, such as rice cooking pots and egg cookers in order to obtain tasty foods, and as soon as a predetermined temperature is reached, in the case of an apparatus such as percolators.

Conventional cooking apparatus utilize a heat-actuated switch of bimetal type which takes advantage of the action of the bimetal in response to temperature. Since the bimetal makes an extremely small displacement relative to the degree of temperature variation and such displacement is continuous and gradual, it is impossible to achieve instantaneous opening or closing of the contacts with bimetallic elements. Therefore, the heat-actuated bimetallic element can not be applied to cooking apparatus as it is and must be modified, as will be mentioned later, in order to be adapted to achieve a quick breaking action.

A bimetallic element when erroneously handled at a high temperature, will be subject to permanent deformation due to external forces and will therefore have its operating point dislocated thereby causing an undesirable error in its temperature response. Further, the bimetallic element is liable to transformation of materials, due to oxidation and like causes, which will result in an unreliable function or a short-circuit that will induce a fire in extreme cases.

Moreover, it is very difficult for a bimetallic element to detect a definite temperature. Since a bimetallic element has an extremely small and continuous amount of displacement relative to a variation in temperature, a slight error in the manipulation of an operating lever will result in a large temperature variation for the type of a switch wherein the operating lever is combined with a bimetallic element to control the manipulation of the operating lever.

Therefore, the primary object of the present invention is to provide a heat-actuated device adapted for cooking apparatus which is free from the defects of the conventional heat-actuated bimetallic elements.

Another object of the present invention is to provide a novel heat-actuated device which makes a quick response upon reaching a predetermined temperature to thereby instantaneously open a heater circuit, and in which the operating temperature can be readily regulated in order to attain satisfactory cooking for variety of foods.

According to the present invention, there is provided a cooking apparatus comprising a heater circuit which is instantaneously cut off by an abrupt temperature rise of a vessel for containing the food to be cooked, a heater for heating the vessel, a switch for opening or closing the heater circuit for deenergizing or energizing the heater, and a heat-actuated device adapted to operate in response to an abrupt temperature rise as in the case of completion of cooking of the food within the vessel or in the case of heating the vessel in an empty state. The heat-actuated device comprises at least one ferrite element abutting the vessel direcly or indirectly through a heat-sensitive plate and having a Curie point in the vicinity of the abrupt rise in temperature in the vessel, at least one permanent magnet disposed opposite each of the ferrite elements and adapted to be moved towards and away from the ferrite element, and a spring for tripping the permanent magnet away from the ferrite element at the temperature in the vicinity of the Curie point of the ferrite element.

There are other objects and particularities of the invention which will be obvious from the following description with reference to the accompanying drawings, in which:

FIG. 1 is a longitudinal sectional view of a heat-actuated switch of a cooking apparatus according to the invention;

FIG. 2 is an exploded view of the heat-sensitive elements of the switch of FIG. 1;

FIG. 3 is a perspective view of the heat-sensitive portion showing the heat-sensitive elements of FIG. 2 in an assembled condition;

FIG. 4a is an end view of the portion A of FIG. 3;

FIG. 4b is a sectional view of the portion A of FIG. 3;

FIG. 5 is an exploded view showing the relationship of the major elements of the heat-sensitive portion, an operating lever for same, and a switch portion of the heater;

FIG. 6a is a plan view of a movable plate;

FIG. 6b is a plan view of the movable plate showing permanent magnets and a connecting rod mounted in place;

FIG. 7a is a perspective view showing an alternate manner of mounting the connecting rod in FIG. 6b in the operating lever;

FIG. 7b is a view similar to FIG. 6b, but showing the connecting rod locked in position in the operating lever;

FIG. 8 is an exploded view showing a manner of mounting the operating lever in an operating member;

FIG. 9 is a side elevational view showing the operating lever mounted in place in the operating member;

FIG. 21b is a bottom view of FIG. 21a;

FIG. 22b is a bottom view of FIG. 22a;

FIG. 24 is an exploded view of an embodiment of a heat-actuated device having means for adjusting operating temperatures;

FIG. 25 is a perspective view of part of the device shown in FIG. 24;

FIG. 26 is a sectional view of FIG. 25;

FIG. 27 is a longitudinal sectional view of the device of FIG. 24 in the assembled condition;

FIG. 28 is a view showing the relative position of the ferrite cores and the permanent magnets in the device of FIG. 27;

Figure 19:
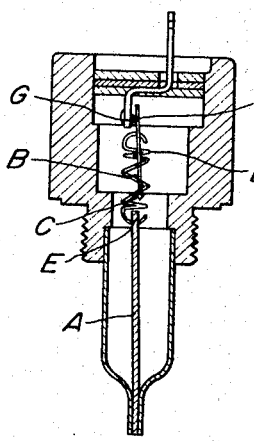
FIG. 19 is a longitudinal sectional view of a conventional bimetal-type heat-actuated switch provided with a snap-opening mechanism.
Figure 20:
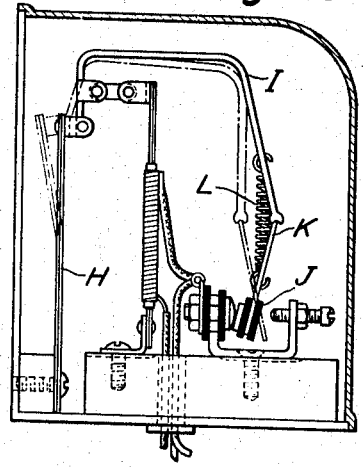
FIG. 20 is a plan view of a conventional bimetal-type heat-actuated switch provided with a displacement magnifying mechanism.

At first, attention will be directed to FIGS. 19 and 20, in which means are provided on conventional heat-actuated switches to adapt them for a snap-opening action. FIG. 19 illustrates a snap-opening mechanism in which a bimetal element A is engaged with a spring D at a portion E. Deformation of the bimetal A due to temperature rise will change the direction in which a contact carrier plate B, supported at the fulcrum C, is normally urged. Therefore, the carrier plate B and contact F carried thereon, is urged instantaneously away from a contact G. FIG. 20 also shows a displacement amplifying mechanism in which deformation of a bimetal element H is transmitted through a connecting rod I to a contact carrier plate K, having a contact J thereon which can swing into either the position shown as a solid line or the position shown as a dotted line by means of a spring L to make or break the contacts.

The present invention as described previously provides a novel and simple heat-actuated device which obviates such complicated mechanisms of prior art bimetal-type heat-actuated switches.

The heat-actuated device of the present invention takes advantage of a temperature magnetization characteristic of a magnetic material in the vicinity of a Curie point. Or more precisely a ferrite element is disposed opposite a spring biased permanent magnet. The permanent magnet is so biased that the attracting force of the permanent magnet overcomes the force of the spring causing the permanent magnet to be attracted towards the ferrite element at temperatures lower than the Curie point of the ferrite element. The force of the spring overcomes the attracting force of the permanent magnet to thereby trip the permanent magnet away from the ferrite element at a high temperature which is in the vicinity of the Curie point of the ferrite element. The arrangement of the heat-actuated device is such that a power source switch is cut off as soon as the permanent magnet is tripped away from the ferrite element to permit the instantaneous opening of contacts in the heater circuit. The operating temperature can readily be adjusted by varying opposing areas of the permanent magnet and the ferrite element relative to each other. The permeability of the ferrite element gradually diminishes as temperature goes up and makes a sudden drop at the Curie point of the ferrite element. Therefore, the permanent magnet will be instantaneously moved away from the ferrite element, irrespective of any slight error in the resiliency of the spring, when the temperature goes up and finally the Curie point is reached. Accordingly, the heat-actuated device, when incorporated in various cooking apparatus, is free from malfunction due to irregularities of the resiliency of the spring and positively and instantaneously operates always at a predetermined temperature to open the switch of the cooking apparatus. Further, by varying the relative opposing areas of the permanent magnet and the ferrite element, the operating temperature of the heat-actuated device can be correspondingly varied while the force of the spring is kept constant. Thus, the above-described defects of the heat-actuated switches with bimetallic elements can be completely eliminated by the heat-actuated device of the invention.

Thus, it will be readily apparent that the present invention makes possible the instantaneous opening of the heater circuit at a desired temperature corresponding to any cooking apparatus to permit excellent cooking and, at the same time, greatly simplifies the construction and arrangement of the heat-actuated device per se.

In the heat-actuated device having a permanent magnet and a ferrite element, the Curie point of the ferrite varies by varying the composition thereof. The problem is whether Mn-Zn system, or Ni-Zn system, or any other system may be selected, but it has been known that the ferrite of Mn-Zn system is optimum from the aspects of characteristic and manufacturing cost. Therefore, the ferrite of Mn-Zn system is prefered for the present invention.

Figure 13:
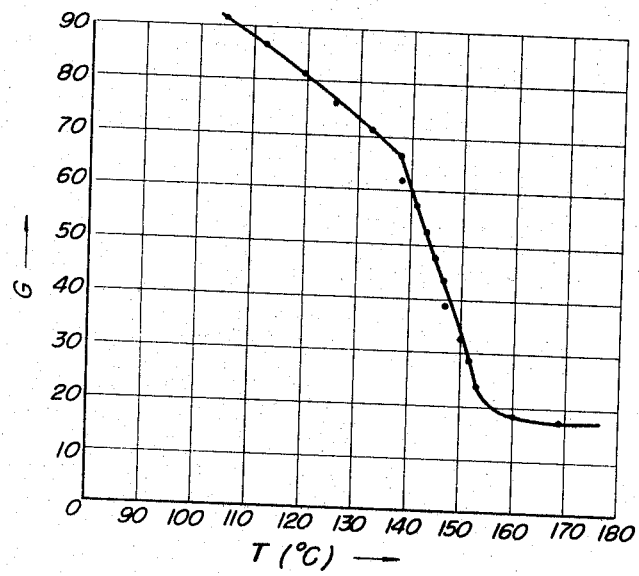
FIG. 13 is a curve showing the relation of temperatures vs. attracting forces of ferrite elements and permanent magnets in the heat-actuated device employed in the rice cooking pot.

The graph in FIG. 13 shows the variation of attracting forces between the ferrite of Mn-Zn system and the permanent magnet relative to the variation of temperatures. The ferrite has a composition of MnO 30%, ZnO 20% and $Fe_2O_3$ 50%. The ordinate and abscissa indicate the attracting force G and the temperature T, respectively.

From the graph, it will be seen that, within an ambient temperature range of $100°$ C.$<t°$ C.$<135°$ C., the relation between the attracting force G (gr.) and the temperature $T°$ C. is approximately expressed as an equation, $$G = -0.75T + 170 \text{ (gr.)}$$

and the attracting force is gradually reduced as the temperature goes up. However, within an ambient temperature range of $135°$ C.$<T°$ C.$<150°$ C., the attracting force G makes a sudden change and the relation can be approximately expressed as an equation;

$$G = -3T + 475 \text{ (gr.)}$$

In this temperature range, $135°$ C. $< T°$ C. $< 150°$ C., the attracting force G makes a large drop, which amounts to a mean variation of 3 grams against a temperature variation of $1°$ C. showing a remarkably lower attracting vicinity of $135°$ C. corresponding to a bent point of the curve amounts to about 10 grams against the temperature variation of $1°$ C. showing a remarkably lower attracting force. Since, on the other hand, the force of the spring which acts in the direction opposite to the direction of the attracting force, is held constant, the remarkable decrease in the attracting force will result in the quick release of the attraction between the ferrite element and the magnet. Thus it is possible to instantaneously and quickly open the switch.

Figure 12:
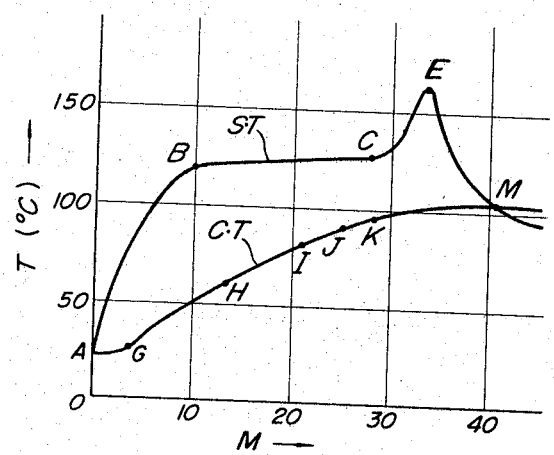
FIG. 12 is a curve showing a temperature characteristic of a rice cooking pot.

FIG. 12 illustrates a curve showing the relation of temperatures at the bottom of a rice cooking pot equipped with the invention and rice cooking temperautres relative to time from the beginning to after the completion of the rice cooking. Curves S.T and C.T indicate the temperature at the bottom of the cooking pot and the cooking temperature, respectively, with temperature T and time M taken as ordinate and abscissa, respectively.

Suitable quantities of rice and water depending on the desired amount and hardness of cooked rice are put in the cooking pot, which is then placed on the heating plate and the heating circuit is closed. (This is shown at the point A on the ordinate T of FIG. 12.) The heating plate is heated by closure of the heating circuit and the cooking pot directly contacting the heating plate is heated by the direct conduction of heat. Thus, the rice and water in the pot are gradually heated. Immediately after the heating circuit has been closed, heat does not immediately reach the central portion of the cooking pot, and temperature at the central portion hardly increases as shown by the portion A–G of the curve. The temperature starts to increase (at point G) as time elapses and heat is successively conducted upwardly. On the other hand, temperature at the heating plate, and the bottom of the cooking pot starts to increase immediately after the heating circuit has been closed. But a large quantity of heat is absorbed by the rice and water in the cooking pot, and the elevation of temperature becomes gradual at a temperature of about $120°$ C., an equilibrium state as shown by the portion B–C being thus maintained. As the boiling proceeds, the rice in the cooking pot receiving the supply of heat from the heating plate is continuously heated while being subject to hydration. Amyloid component of the rice starts to turn into $\alpha$-starch at a temperature of $61°$ C. (point H in FIG. 12), and temperature further goes up to reach a range of 80 to $90°$ C. (portion I–J), However, this range is past in an extremely short time period owing to the excellent thermal efficiency of the heating plate wherein electric heating wires are integrally embedded and molded. During this time, the quantity of heat emitted from portions other than the contact surface between the heating plate and the cooking pot are also effective to heat the cooking pot from the periphery thereof. As the boiling further proceeds, the water in the cooking pot is absorbed into the rice by hydration, and there is an extremely small amount of water still remaining in the form of a fluid (point K in the figure). Therefore, the balance between the supply of heat from the heating plate and the absorption of heat by the rice and water in the cooking pot is lost. The heat supplied by the heating plate will no longer be absorbed by the contents of the cooking pot. The temperature of the cooking pot and the heating plate therefore makes an abrupt rise which reaches a temperature of 150 to $180°$ C. (portion C–E in the figure) that is higher than said balance temperature (portion B–C). The heater circuit is cut off at a certain temperature in the range of this abrupt temperature rise.

The temperature of the heating plate after the cut-off of the heater circuit still goes up due to remaining heat and finally reaches a peak E, after which it gradually decreases. The temperature of the heating plate makes an abrupt rise after the water in the form of fluid has been exhausted (points K and C in the figure). Due to this temperature rise, the rice is further heated even after the point K and excess heat is stored in the heating plate. Moreover, the rice is heated in all the directions by the heat emitted about the cooking pot. Even after the heater circuit has been cut off, rice boiling is continued by the heat stored in the heating plate until the point M is reached, whereat the temperature of the heating plate and the temperature of the boiled rice intersect with each other. Thereafter, the boiled rice is temporarily maintained at $100°$ C. by the heat accumulated therein and subjected to heating with steam.

The rice thus cooked is satisfactorily digestible in any of the portions in the pot and is most delicious to the taste, that is to say, the rice having $\alpha$-amylose throughout can be obtained.

As explained in detail in the foregoing, delicious rice cannot be obtained unless the heater circuit is accurately cut off at a temperature in the range wherein the temperature of the heating plate, hence the bottom of the cooking pot makes an abrupt rise (portion C–E in the figure). In other words, too high a temperature will result in scorching and too low a temperature will result in the rice that tastes badly. The operating temperature of the heat-actuated device using the ferrite element shown in FIG. 13 must correspond to the temperature at the end of rice boiling. When incorporated in the rice cooking pot, the heat-actuated device accurately senses this temperature and can make snap-opening and snap-closing of the circuit of the electric heating wires, whereby delicious rice can be obtained at all times.

The heat-actuated device will be explained hereafter, taking the rice cooking pot as an example. In FIG. 1, ferrite elements 1 of Mn-Zn composition are mounted in a top plate 2. Permanent magnets 3 are mounted on a movable plate 4 in opposition to the ferrite elements 1. The movable plate 4 is adapted to be guided vertically within a guide sleeve 5, the upper open end of which is closed by the top plate 2. A spring 6 is interposed between the top plate 2 and the movable plate 4, the spring 6 having a resilient force that is weaker than the attracting force between the ferrite elements 1 and the permanent magnets 3, but stronger than the repulsing force between them. The guide sleeve 5 is disposed in an outer casing 7, which has the edge of an upper opening thereof bent outwardly to form a mounting flange 8 and a plurality of outwardly and upwardly extending flaps 9 formed by cutting open portions of the side wall. The outer casing 7 is mounted on a central opening of a heating plate 11 having a heater 10 integrally affixed thereto in such a manner that the inner peripheral portion of the central opening of the heating plate 11 is held between the mounting flange 8 and the flaps 9 of the outer casing 7. The guide sleeve 5 is resiliently disposed in the outer casing 7 by means of a coil spring 12, and movement of the sleeve 5 is limited by the engagement of legs 13 provided at the lower part thereof with engaging slots 7′ provided at the outer casing 7. The top plate 2 provided at the top of the guide sleeve 5 is exposed above the heating plate 11.

The movable plate 4 is connected to the end of an operating lever 14 by means of a connecting rod 16. The operating lever 14 is adapted to be operated from outside for swinging movement about pivots 15. The connecting rod 16 passes through bottom openings formed in the guide sleeve 5 and the outer casing 7. An insulated projection 17 is provided on the operating lever 14 towards the end connected to the connecting rod 16. An operating member 18 is firmly secured on the operating lever 14 at the end remote from the connecting rod 16.

A switch 22 for the heater 10 comprises a contact carrier plate 20 which is mounted on the inner end of a pin 19' of a plug socket 19 for power supply. The switch 22 is normally closed, but is opened whenever the contact carrier plate 20 is urged downwardly by the insulated projection 17 when the permanent magnet 3 is tripped away from the ferrite element 1. A body portion of the rice cooking pot placed on the heating plate 11 is generally indicated at 21. The pot is in close contact with the heating plate 11 and the top plate 2 is close to the central portion of the bottom of the pot.

The heat-actuated device operates in the following manner. When the pot 21 containing rice and water therein is placed on the heating plate 11, the top plate 2 of the device comes in close contact with the bottom surface of the pot 21 since the top plate 2 is exposed on the heating plate 11 and is resiliently supported by the spring 12. The operating member 18 will press downwardly to rotate the operating lever 14 about pivots 15 thereby urging upwardly the movable plate 4 by means of the connecting rod 16. The movable plate will be moved upwardly against the resilient force exerted by the spring 6 until finally the permanent magnet 15, carried on the movable plate 4, abuts the ferrite elements 1 carried on the top plate 2. The movable plate 4 will thus be as shown attracted to the top plate 2, since the resilient force of the spring 6 is less than the attracting force between the ferrite elements 1 and the permanent magnets 3.

Thus, the end of the operating lever 14 remote from the operating member 18 is kept at the lifted position. The insulated projection 17 carried by the lever 14 will not contact the carrier plate 20 of the heat switch thereby allowing the latter to move upwardly to close the contacts. Therefore, current will flow through the heater 10 to initiate heating for cooking the rice.

At the completion of the rice boiling, the temperature at the bottom surface of the pot 21 makes an abrupt rise. When the temperature rise takes place, a sudden decrease of the permeability results in the ferrite elements 1 which have the Curie point immediately above the temperature of rice boiling. The attraction between the ferrite elements 1 and the permanent magnets 3 is thereby weakened and finally overcome by the resilient force of the spring 6, which urges the movable plate 4 away from the top plate 2. The downward movement of the movable plate 4 results in the downward movement of the end of the operating lever 14 through the connecting rod 16, which interconnects the plate and the lever 4. At the same time, the insulated projection 17 will urge the contact carrier plate 20 downwardly to open the switch 22 of the heater 10 to thereby cut off the power supply thereto. This snap-opening of the switch 22 for the heater 10 is caused by the abrupt and quick tripping of the permanent magnets 3 away from the ferrite elements 1 by means of the spring 6 in the vicinity of the Curie point of the ferrite elements 1.

As described in the foregoing, it is possible to make and break the contacts of the heater 10 instantaneously and at an accurate operating temperature by the appropriate combination of the ferrite elements 1, permanent magnets 3 and spring 6. According to results of measurement taken on two ferrite elements of the same composition, it has been shown that the tripping force at a temperature far lower than the Curie point is subject to influences of out-of-flatness of the ferrite elements 1 and the magnets 3, and irregularities of properties of these two elements. But the tripping force in the vicinity of the Curie point is almost same for both of the ferrite elements which are free from irregular behaviors. This fact indicates little influence due to manufacturing errors involved and suitability to mass production. Therefore, the opening temperature of the heater circuit is little influenced even when there is a slight error in the resilient force of the spring 6. That is, a slight error in the tensile force of the spring 6 appears as a small variation in the temperature, and will not affect the control temperature too much. The ferrites of approximately similar compositions, when sintered under approximately the same condition, show the property as shown by the curve of FIG. 13. Thus it is easy to obtain the ferrites of the same properties. This is advantageous for the manufacture of switches having a same control temperature.

The above description has been made with specific reference to the heat-actuated device comprising the ferrite elements of MnO 30%, ZnO 20% and Fe$_2$O$_3$ 50%, permanent magnets and spring. Now, the description will be directed to a general effect obtained by the device. The heat-actuated device has been composed by taking advantage of a rapid drop of the attracting force between the ferrite and the permanent magnet at a certain temperature. Such heat-actuated device permits the instantaneous opening and closing of the heater circuit without any necessity of the displacement magnifying mechanism and the snap-opening mechanism usually employed is conventional bimetal switches.

Or more precisely, when the attracting force between the ferrite and the permanent magnet decreases as temperature rises and finally a temperature range is reached wherein the attracting force makes a sudden decrease, a slight temperature variation greatly varies the attracting force. Now, an external force equal to the attracting force during the sudden drop thereof is applied in the direction opposite to the direction of the attracting force. Then, even though the attracting force is greater than the external force at a temperature of $t°$ C., a very small increment of temperature by $\Delta t°$ C., will cause the great variation in the attracting force. Therefore, a point having the attracting force of the same magnitude as the external force is instaneously passed, and the instantaneous opening of the heater circuit is thereby rendered possible. The case of cooling from a high temperature likewise follows the course contrary to the case of the temperature rise and the heater circuit can be instantaneously closed.

Moreover, the heat-actuated device of the present invention can be assembled in an extremely simple manner. It will also provide a uniform control temperature and yet it is extremely easy to determine the control temperature. In other words, the control temperature ranging from the atmospheric temperature to a temperature of about 500° C. can freely be obtained by varying the rate of mixture of components during the shaping of the ferrite elements. In the case, for example, of percolators or egg cookers, the ferrite elements can be shaped to suit these cooking apparatus. Thus, it is possible to obtain a switch which can instantaneously open or close the heater circuit at an optimum period just like the rice cooking pot referred to above.

Foregoing description has been made to explain the outline of the apparatus according to the invention, with particular reference to the rice cooking pot by way of an example. Now, construction and arrangement of the apparatus will be described in more details in FIG. 2 and succeeding drawings.

In FIGS. 2–9, two ferrite elements 1 are provided on the top plate 2, and two permanent magnets 3 are also provided on the movable plate 4 in opposition to the ferrite elements 1. A guide rod 23 is firmly secured to the top plate 2 with one end depending from the top plate 2 and passing freely through a hole 30 in the movable plate 4. The rod serves to prevent the lateral displacement of the top plate 2. The movable plate 4 is further provided with a key-hole like opening at the central portion thereof. The key hole opening includes a slot 26 for receiving therein a head 25 of the connecting rod 16 and a substantially circular hole 28 in which the head 25 can rotate. The operating lever 14 is provided at its end with an opening 29 which has the same shape and disposed in the same direction as the opening 24. The connecting rod 16 is connected to the operating lever 14 in a manner so that the upper and lower heads 25 and 27 of the connecting rod 16 are passed into the slots 24 and 29 of the movable plate 4 and the operating lever 14, respectively, then turned to be disposed at right angles with the slots and locked therein. Subsequently, the two permanent magnets 3 are fixed to the movable plate 4 so as to cover the both ends of the slots 26. Therefore, the connecting rod 16 is locked from rotation by being held between the two permanent magnets 3, and thus can connect the movable plate 4 to the operating lever 14 without any special means such as fixtures or jigs.

The connecting rod 16 may be engaged with the operating lever 14 in a manner as shown in FIG. 7. A substantially Y-shaped hole 31 may be provided at the end of the operating lever 14. The lower portion of the connecting rod 16 is formed as a mounting portion 32 of substantially U-shaped section to suit the U-shaped portion of the hole 31. The mounting portion 32 is inserted into the hole 31 and subsequently straightened out to provide firm engagement between the connecting rod 16 and the operating lever 14.

The ends of the legs 13 of the guide sleeve 5 are cut out as shown at portions 33. After the legs 13 are made to protrude out of the engageing slots 7' of the outer casing 7, the portions 33 are bent at right angles with the holes 7'. This will engage the roots of the portions 33 with the slots 7' and limit the upward movement of the guide sleeve 5.

As best shown in FIGS. 4a and 4b, the portions 33 are cut in slanting relation with respect to the longitudinal direction of the legs 13. The end edges 34 of the legs 13 formed by the cut-in portions 33 extend outwardly from the slots 7' for providing smooth guide of the guide sleeve 5 in the vertical direction with respect to the outer casing 7.

The operating lever 14 is mounted in the operating member 18 in the following manner. The operating member 18 is of a substantially box-like shape except that it is opened at the lower portion and the portion opposite the operating lever 14, as shown in FIGS. 8 and 9. Detent 35 are formed on both lower edges of the member 18 and grooves 36 are provided on both inner side faces of the member 18. The end edge of the operating lever 14 is bent upwardly to form an abutting flange 37 which abuts the rear wall of the member 18 when the lever 14 is fitted in the member 18. The lever 14 is provided with generally L-shaped upstanding portions 38 on both sides thereof for sliding engagement with the grooves 36 of the member 18, and projections 39 extending outwardly from both sides for engagement with the detents 35 of the member 18. When the lever 14 is forced into the member 18 with the L-shaped portions 38 fitted in the grooves 36 of the member 18, the lever 14 is guided with its L-shaped portions 38 and projection 39 along the grooves 36 and lower edges of the member 18, respectively, until finally the projections 39 abut the detents 35. By still forcing the lever 14 inwardly into the member 18, the projections 39 ride over the detents 35 and are firmly locked by the detents from movement. Since, in this case, the abutting flange 37 abuts the rear wall of the member 18, the operating lever 14 can be securely mounted in the operating member 18 without any necessity of special fixtures or jigs.

Figure 10:
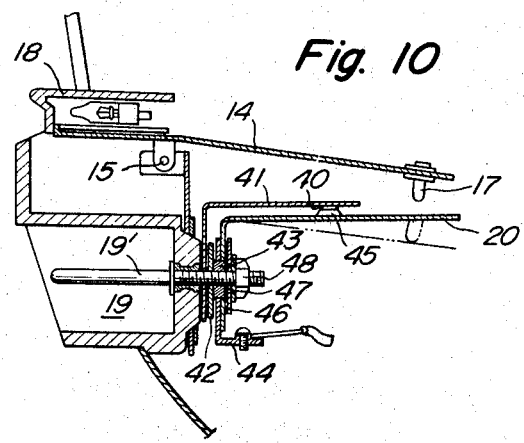
FIG. 10 is a longitudinal sectional view of the switch portion of the heater.
Figure 11:
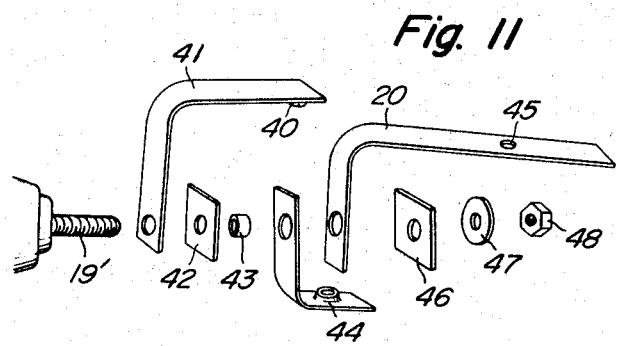
FIG. 11 is an exploded view of the contact assembly shown in FIG. 10.

The switch 22 for the heater 10 is as shown in FIGS. 10 and 11. A carrier plate 41 having a stationary contact 40, an insulating plate 42, an insulating ring 43, a terminal connection plate 44 firmly secured to the insulating ring 43, the carrier plate 20 having a movable contact 45, an insulating plate 46 and a lock washer 47 are successively mounted on the threaded pin 19' of the plug socket 19 for power supply and are finally fastened by means of a tightening nut 48 to form the switch 22. The contacts 40 and 45 are normally closed to supply current to the heater 10, but are opened when the operating lever 14 is urged downwardly so that the insulating projection 17 will force the carrier plate 20 downwardly. This arrangement does not require any lead wires for connecting the pin 19' with the carrier plates 41 and 20 and the construction can thereby be greatly simplified.

Figure 14:
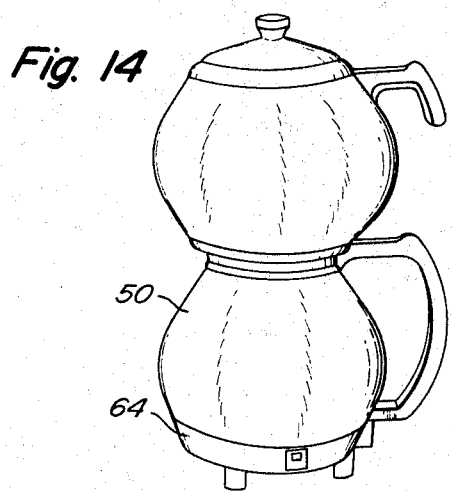
FIG. 14 is an external view of a percolator.
Figure 15:
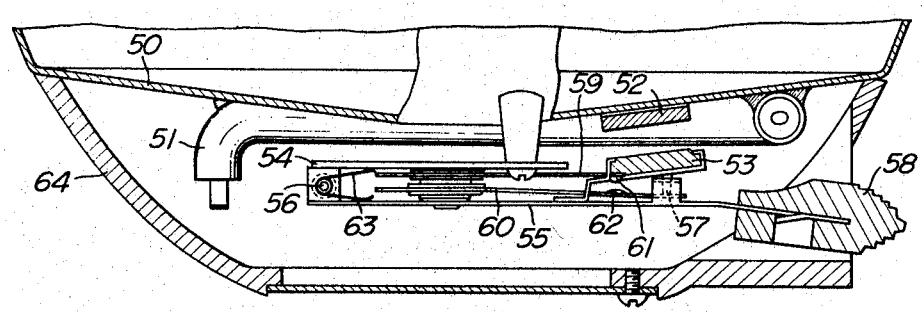
FIG. 15 is a longitudinal sectional view of a heater and a switch portion of the percolator shown in FIG. 14.
Figure 16:
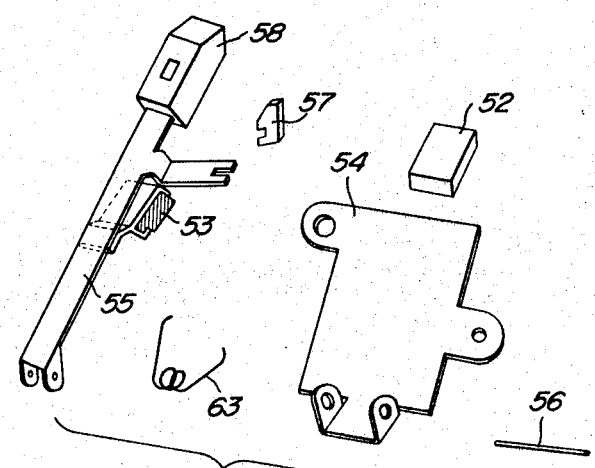
FIG. 16 is an exploded view of an operating lever for urging a permanent magnet towards and away from a ferrite element, and a frame for mounting the operating lever thereon.

Now, description will be made with reference to percolators and egg cookers. FIGS. 14–16 show a percolator to which the invention is adapted. The percolator comprises a vessel 50 on the bottom of which a heater 51 is provided. A ferrite element 52 is mounted on the lower surface of the bottom of the vessel 50. A frame member 54 is fitted to the bottom of the vessel 50 by a suitable means. An operating lever 55 is swingably supported at the end by the frame 54 by means of a pivot pin 56 and has a permanent magnet 53 mounted at about its central portion at a position opposite the ferrite element 52. An insulated projection 57 is also mounted on the frame member 54. An operating button 58 is fitted to the operating lever 54 at the end remote from the swingably supported end 56. Carrier plates 59 and 60 for contacts 61 and 62, respectively, are fitted to the frame member 54 in insulated relationship from the latter. The contacts are normally urged to a closed position. The insulated projection 57 provided on the lever 55 is disposed opposite the carrier plate 60 and will not urge the carrier plate 60 whenever the permanent magnet 53 is attracted to the ferrite element 52. When, however, the ferrite element 52 is demagnetized due to temperature rise at the bottom of the vessel 50 and the permanent magnet 53 is tripped away from the ferrite element 52, the insulated projection 57 forces the carrier plate 60 downwardly to open the contacts 61 and 62 to thereby open the circuit of the heater 51. In order to normally urge the operating lever 55 and hence the permanent magnet 53 away from the ferrite element 52, a spring 63 is provided at the portion where the lever 55 is swingably supported by the frame member 54. Above elements provided at the bottom of the vessel 50 except for the button 58 which is totally enclosed by a cover 64 to provide a neat appearance.

The percolator operates in the following manner. At first, the operating button 58 is manipulated to permit the attraction of the permanent magnet 53 towards the ferrite element 52 to thereby make the contacts 61 and 62 to allow for a flow of current through the circuit of the heater 51. The vessel 50 is heated and heat is conducted to the contents of the vessel 50. In this case, the composition of the ferrite element 52 has been suitably selected so that the Curie point is reached when the temperature of the vessel 50 is elevated as high as a predetermined value, or hot water in the lower portion of the vessel has been completely fed upwardly into the upper portion of the vessel. Therefore, attraction of the ferrite element 52 by the permanent magnet 53 is reduced at this predetermined temperature and the permanent magnet 53 is instantaneously tripped away from the ferrite element 52 by the action of the spring 63. The insulated projection 57 forces the carrier plate 60 downwardly to open the circuit of the heater 51. Therefore, negative pressure prevails in the lower portion of the vessel and hot water in the upper portion of the vessel is drawn thereinto in the course of which the powder material is percolated.

Figure 17:
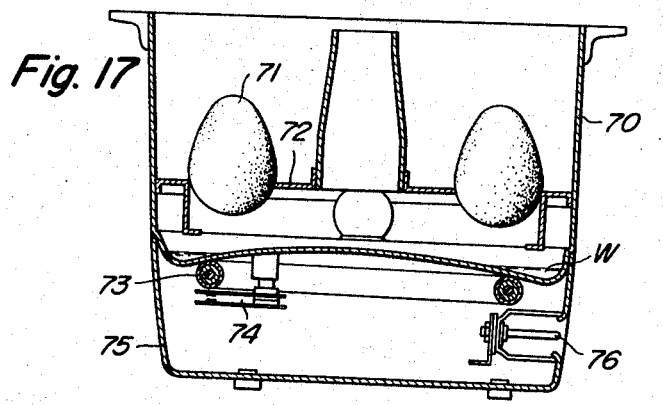
FIG. 17 is a longitudinal sectional view of an egg cooker according to the invention.
Figure 18:
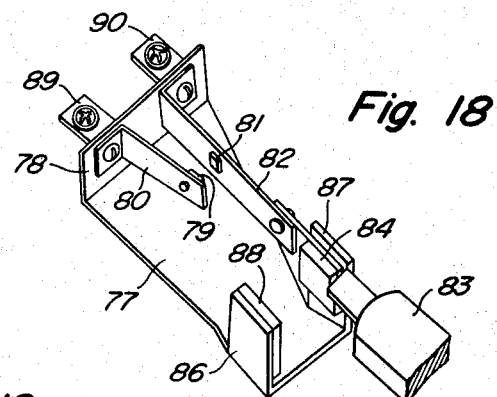
FIG. 18 is a perspective view of a heat-actuated switch as adapted for the egg cooker.

FIG. 17 shows an embodiment of an egg cooker according to the invention and FIG. 18 illustrates a heat-actuated switch incorporated therein. The egg cooker comprises a boiling pot 70 of substantially cylindrical configuration closed at the bottom. The pot 70 is formed of thin metal sheet having a comparatively small heat capacity. Within the boiling pot 70, there are contained hot water W and and egg mounting member 72 on which eggs 71 are placed. A heater 73 is provided on the outer surface of the bottom of the pot 70. A heat-actuated switch 74 and the heater 73 are covered by a cover 75 which is coupled to the pot 70 in a convenient manner. An attachment plug 76 is provided at one portion of the cover 75.

The heat-actuated switch 74 is as shown in FIG. 18, and comprises a substantially L-shaped base plate 77 of nonmagnetic material. A resilient plate 80 having a stationary contact 79 and a resilient plate 82 carrying a movable contact 81 are fitted to an upright portion 78 of the base plate 77. A grip 83 and a permanent magnet 84 are mounted in insulated relationship from the free end of the plate 82. Two portions 86 and 87 extend upright from both longitudinal edges of a horizontal flat portion 85 of the base plate 77 in opposition to each other. A ferrite element 88 is provided on the portion 86 so as to oppose the permanent magnet 84. Connection terminals 89 and 90 for the heater 73 are connected to the stationary and movable plate 80 and 81, respectively.

The egg cooker shown in FIGS. 17 and 18 operates in the following manner. At first, the grip 83 is moved towards the ferrite element 88 against the resilient reaction of the movable resilient plate 82 to cause the permanent magnet 84 to be attracted to the ferrite element 88. Then, the movable contact 81 abuts the stationary contact 79 to energize the heater 73 for heating the boiling pot 70. Therefore, hot water W boils to thereby boil the eggs 71. The Curie point of the ferrite element 88 is selected to correspond the ending temperature of boiling. Then, when temperature at the bottom of the pot 70 exceeds the Curie point, the ferrite element 88 loses its ability to be attracted to the permanent magnet 84. The movable resilient plate 82 springs back to the original position, due to its resiliency, and instantaneously draws the contact 81 away from the contact 79 to thereby deenergize the heater 73.

Although, the ferrite element 88 is heated by the ambient temperature developed by the heater 73 to reach the Curie point, the ferrite element 88 may be directly fitted to the bottom of the boiling pot 70. Though the movable resilient plate 82 is made to open the contacts by its own resiliency, similar effect may be attained by provided a suitable spring thereto.

In either the egg cooker or the percolator, the composition of the ferrite element incorporated therein may be suitably selected to provide an optimum property for the purpose of cooking intended. That is to say, arrangement may be made so that the ferrite element, as in the case of the rice cooking pot, reaches the Curie point at a certain temperature for opening the heater circuit, and there may be obtained a curve similar to those shown in FIG. 13. The foregoing description has been specifically directed to the cooking apparatus provided with the heat-actuated devices wherein the ferrite element, permanent magnet and spring are combined with one another to trip the permanent magnet away from the ferrite element by the change of permeability thereof. The operating temperature of these heat-actuated devices is determined by the composition of the ferrite element and the action of the spring, in which the Curie point of the ferrite element is inherent in materials employed and can not be changed once it has been so manufactured. Therefore, it is almost impossible to vary the operating temperature in the heat-actuated devices using such ferrite element. Although the heat-actuated devices work excellently at the accurate temperature by the abrupt variation of permeability of the ferrite element, such devices are adapted to work always at the predetermined temperature, and the cooking is limited to a predetermined degree obtainable at the specific temperature. Therefore, any variation or departure from the predetermined degree of cooking is nearly impossible.

In the rice cooking pot, for example, rice can be cooked to have a constant degree of boiling at all times by the heat-actuated device. However, someone may be in favor of hard-boiled rice, and others may be in favor of soft-boiled rice. It may therefore be necessary to prepare the rice to suit the taste of each individual person. Even when the heat-actuated device normally operates at a predetermined temperature to open the switch, the condition of cooked rice may vary depending on the quality of rice or water. It may be very advantageous that the heat-actuated device can operate at variable temperatures.

Heat-actuated switches satisfying these requirements are illustrated by way of examples in FIGS. 21–32.

Figure 21A:
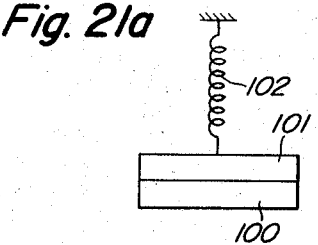
FIG. 21a is a side elevational view of a ferrite element and a permanent magnet in the attracted condition.
Figure 22A:
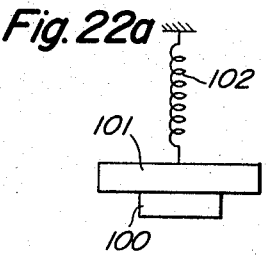
FIG. 22a is a side elevational view of the ferrite element and the permanent magnet in another attracted condition.
Figure 21B:
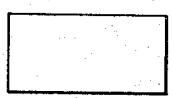
Figure 22B:
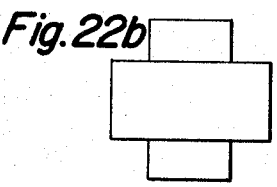

Referring to FIGS. 21 and 22, a ferrite element 100 is disposed opposite and made to closely abut a permanent magnet 101. A coil spring 102 is provided to trip the permanent magnet 101 away from the ferrite 100. The spring 102 trips the magnet 101 at a point where the ferrite element 100 is suddenly demagnetized as at the Curie point, or a point where a force to retain the ferrite 100 with the magnet 101 is lost.

Figure 23:
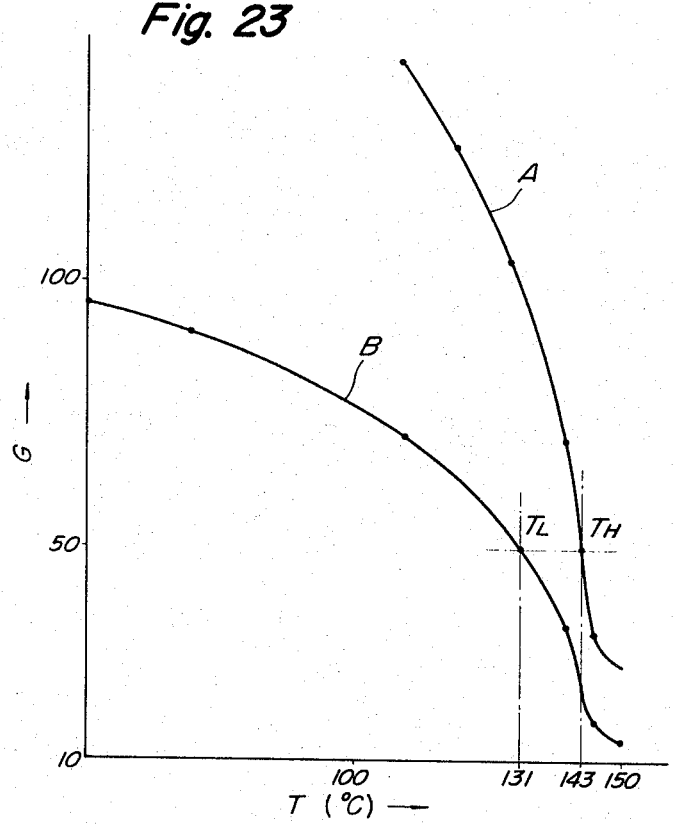
FIG. 23 is a graphical explanation of the relationship of temperature vs. tripping forces between the ferrite element and the permanent magnet shown in FIGS. 21 and 22.
Figure 29:
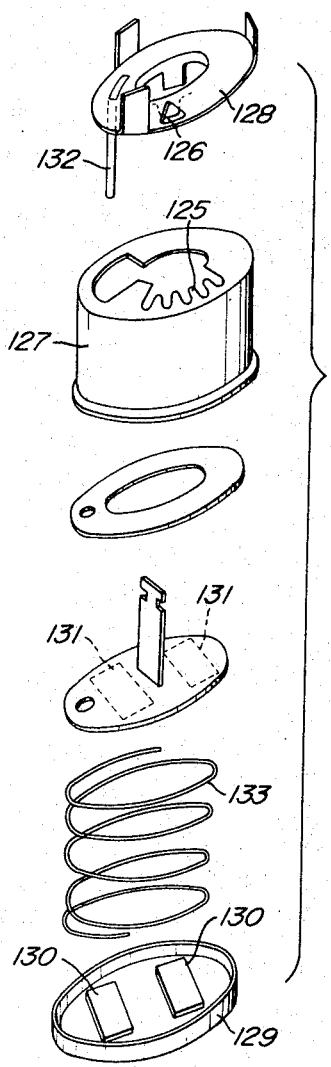
FIG. 29 is an exploded view of another embodiment of a heat-actuated device having means for adjusting operating temperatures.
Figure 30:
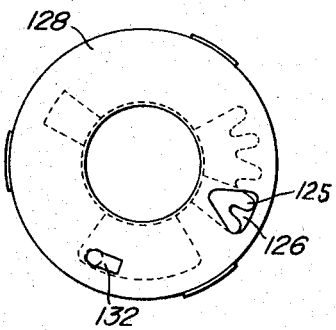
FIG. 30 is a top plan view of the device of FIG. 29.
Figure 31:
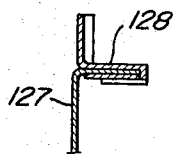
FIG. 31 is a side elevational view of part of the device of FIG. 29.

FIG. 23 shows the relation between temperatures and retaining forces between the ferrite element 100 and the permanent magnet 101. Supposing that the ferrite element and the magnet have a same length 25 mm., width 10 mm., and thickness 3 mm., and the Curie point of the ferrite element is in the vicinity of 143° C. Then, the combination of the ferrite element 100 and the permanent magnet 101 as shown in FIG. 21 is expressed by the relation shown by the curve A of FIG. 23. From this curve, it will be seen that a force of the spring 102 of 50 grams will trip the permanent magnet 101 away from the ferrite element 100 at a temperature of 143° C.

In order to change the operating temperature of 143° C., it may first be considered to change the tripping force. However, this can be more simply attained by varying the manner of combination of the ferrite element 100 and the permanent magnet 101 as shown in FIG. 22. In this case, the opposing areas of the permanent magnet 101 and the ferrite element 100 relative to each other will be half the areas of FIG. 21 and the relation between temperatures and tripping forces can be expressed by the curve B of FIG. 23. When points of the tripping of 50 grams are sought on the curves A and B, TH and TL will be given, respectively. The points TH and TL correspond temperatures of 143° C. and 131° C., and a temperature difference of 12° C. can thereby be obtained.

Therefore, it will be known that, by varying the opposing areas of the ferrite element 100 and the permanent magnet 101 various operating temperatures can be obtained. That is to say, by varying the degree of rotation of the ferrite element 100 relative to the permanent magnet 101, the operating temperatures can be widely varied from TH through TL.

A preferred embodiment of an adjusting means for the operating temperatures is illustrated in FIGS. 24–28. The adjusting means comprises a heat conductive plate 103 which abuts the bottom of a body to be heated. Two ferrite elements 104 are provided on the inner face of the heat conductive plate 103. Permanent magnets 106 are disposed opposite the ferrite elements 104 and fitted on a movable plate 105 which has an operating rod 107 secured upright at the central portion of the surface remote from the magnets 106. A perforation 108 is provided at a portion adjacent to the peripheral edge of the movable plate 105. A coil spring 109 is interposed between the heat-conductive plate 103 and the movable plate 105 and has a resilient force which is weaker than the attracting force between the ferrite elements 104 and the magnets 106. But the spring has sufficient resilient force for tripping the magnets 106 away from the ferrite elements 104 at a temperature in the vicinity of the Curie point of the ferrite elements 104. An annular resilient plate 110, spring 109 and movable plate 105 are housed in a casing 112, the upper open end of which is closed by the heat-conductive plate 103. The bottom of the casing 112 is provided with a guide opening 114 having teeth 113 at one portion thereof. An annular adjusting plate 115 is fitted on the outer face of the bottom of the casing 112. The adjusting plate 115 has a plurality of guide legs 116 on its outer periphery and a plurality of mounting pieces 117 extending from the inner periphery of the bottom opening thereof in the direction opposite to the guide legs 116. A guide rod 118 extends from the adjusting plate 115 in the direction of the mounting pieces 117 freely passing through aligned perforations 111 and 108 of the resilient plate 110 and the movable plate 105, respectively, for guiding vertical movement of the movable plate 105. A recess 120 having a central hole 119 is provided on the adjusting plate 115 at a portion opposite the teeth 113. A gear 121 having a manipulating head 122 is disposed in the recess 120 for engagement with the teeth 13 and the head 122 protrudes upwardly through the hole 119.

The adjusting plate 115 is mounted in the casing 112 so that the mounting pieces 117 are bent outwardly for engagement with the inner peripheral portion of the guide opening 114 with the resilient plate 110 held between the bottom of the casing 112 and the mounting pieces 117. The resilient plate 110 is effective to force the lower face of the gear 121 upwardly to retain the gear 121 in the recess 120 and, at the same time, to permit unobstructed movement of the casing 112 relative to the adjusting plate 115. The guide legs 116 are also effective to guide the vertical movement of the casing 112 relative to cooking apparatus when the former is coupled to the latter. The operating rod 107 is adapted to open or close the switch (not shown).

When the head 122 protruding from the hole 119 is manipulated by means such as a screw driver to rotate the gear 121, the casing 112 is rotated relative to the adjusting plate 115 and the ferrite elements 104 on the heat-conductive plate 103 are also displaced. The permanent magnets 106 are held from rotation by the guide rod 118 of the adjusting plate 115 and remain stationary. Therefore, the relative position between the permanent magnets 106 and the ferrite elements 104 is as shown in FIG. 28, and the opposing areas will become correspondingly smaller than in the original condition wherein they bodily abut with each other. This will result in a smaller attracting force and the operating temperature will vary though the resilient force of the spring 109 remains unchanged.

Figure 32:
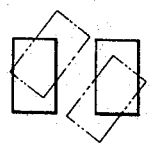
FIG. 32 is a view showing the relative position of the ferrite elements and the permanent magnets in the device of FIG. 29.

Another embodiment of the adjusting means is further shown in FIGS. 29-32. This embodiment is substantially similar to the embodiment of FIGS. 24-28, except that a plurality of notches 125 and an adjusting hole 126 are formed in place of the teeth 113, the recess 120 and the gear 121, respectively. Therefore, a casing 127 and hence ferrite elements 130 provided on a heat-conductive plate 129 can be rotated relative to an adjusting plate 128 by merely feeding one notch 125 after another by means such as a screw driver inserted through the hole 126. Permanent magnets 131 are held from rotation by means of a guide rod 132 integral with the adjusting plate 128 and remain stationary. Therefore, the relative position between the permanent magnets 131 and the ferrite elements 130 is as shown in FIG. 32 just as in the case of the previous embodiment. It will be apparent that the operating temperature can likewise be varied.

What is claimed is:

1. A cooking apparatus having a heater circuit which is instantaneously cut off by an abrupt temperature rise in the apparatus, comprising a vessel for containing the food to be cooked, a heating plate having heater means for heating said vessel, switching means for energizing and deenergizing said heater means, a heat-actuated device adapted to operate in response to an abrupt temperature rise in said vessel, said heat-actuated device comprising at least one substantially rectangular ferrite element abutting said vessel through a heat-conductive plate, said ferrite element having a Curie point in the vicinity of the abrupt temperature rise in said vessel, at least one substantially rectangular permanent magnet disposed opposite each said ferrite element and adapted to be moved relative to said element, spring means disposed between said ferrite element and said permanent magnet, said spring means having a resilient force which is weaker than the attracting force between the ferrite element and the permanent magnet at temperatures below the Curie point but being sufficient to move them apart when the temperature of said vessel approaches the Curie point of the ferrite element, said heat-actuated device being further provided with means to vary the amount of the surface area of said ferrite element and permanent magnet in opposition to each other to thereby adjust the attractive forces between the ferrite element and magnet and thus the operating temperature of the switching means, said means to vary the opposing areas of the ferrite element and the permanent magnet comprising a substantially cylindrical casing, the upper end of which is attached to said heat-conducting plate and which has teeth formed about an opening at its bottom end, a plate rotatably and axially movably mounted within said cylindrical casing and having said permanent magnet secured thereon, an adjusting plate loosely rotatably coupled to the outer face of the bottom of the casing and connected to the movable plate for rotation therewith, said adjusting plate being provided with gear means in operable engagement with the teeth of said casing to thereby rotate said movable plate, means connected to said permanent magnet to actuate said switching means.

2. A cooking apparatus having a heater circuit which is instantaneously cut off by an abrupt temperature rise in the apparatus, comprising a vessel for containing the food to be cooked, a heating plate having heater means for heating said vessel, switching means for energizing and deenergizing said heater means, a heat-actuated device adapted to operate in response to an abrupt temperature rise in said vessel, said heat-actuated device comprising at least one substantially rectangular ferrite element abutting said vessel through a heat-conductive plate, said ferrite element having a Curie point in the vicinity of the abrupt temperature rise in said vessel, at least one substantially rectangular permanent magnet disposed opposite each said ferrite element and adapted to be moved relative to said element, spring means disposed between said ferrite element and said permanent magnet, said spring means having a resilient force which is weaker than the attractive force between the ferrite element and the permanent magnet at temperatures below the Curie point but being sufficient to move them apart when the temperature of said vessel approaches the Curie point of the ferrite element, said heat-actuated device being further provided with means to vary the amount of the surface area of said ferrite element and permanent magnet in opposition to each other to thereby adjust the attractive forces between the ferrite element and magnet and thereby the operating temperature of the switching means, said means to vary the opposing areas of the ferrite element and the permanent magnet comprising a substantially cylindrical casing depending from said heat-conductive plate and having a plurality of notches formed about an opening in a bottom portion thereof, a movable plate rotatable and axially movably mounted with said cylindrical casing and having said permanent magnet secured thereon, an adjusting plate disposed outside the bottom of said casing in loosely rotatable coupled relation therewith, said adjusting plate being connected to the movable plate for rotation therewith, said adjusting plate being provided with a hole permitting means to be inserted therethrough to engage with the notches of said casing to thereby rotate said movable plate, means connected to said permanent magnet to actuate said switching means.

3. A cooking apparatus having a heater circuit which is instantaneously cut off by an abrupt temperature rise in the apparatus, comprising a vessel for containing the food to be cooked, a heating plate having heater means for heating said vessel, switching means for energizing and deenergizing said heater means, a heat-actuated device adapted to operate in response to an abrupt temperature rise in said vessel, said heat-actuated device comprising at least one substantially rectangular ferrite element abutting said vessel through a heat-conductive plate, said ferrite element having a Curie point in the vicinity of the abrupt temperature rise in said vessel, at least one substantially rectangular permanent magnet disposed opposite each said ferrite element and adapted to be moved relative to said element, spring means disposed between said ferrite element and said permanent magnet, said spring means having a resilient force which is weaker than the attracting force between the ferrite element and the permanent magnet at temperatures below the Curie point but being sufficient to move them apart when the temperature of said vessel approaches the Curie point of the ferrite element, means connected to said permanent magnet to actuate said switching means, said heat-actuated device further comprising an outer casing fitted to said heat-conducting plate, a guide sleeve resiliently mounted in said outer casing for vertical movement with respect thereto, a movable plate vertically movable within said guide sleeve and having said permanent magnet provided thereon, said means connected to said permanent magnet to actuate said switching means including an operating lever having an operating portion at one end thereof, a connecting rod operatively connected between said operating lever and said movable plate and being adapted to move said operating portion in response to said movable plate moving upwardly and downwardly, and an insulated projection provided on said operating lever for actuating said switching means.

4. A cooking apparatus according to claim 1 wherein said heat-conductive plate is mounted retractably protruding above said heating plate.

5. A cooking apparatus according to claim 3 wherein said guide sleeve is provided with a plurality of legs which protrude from engaging slots provided in a bottom portion of said outer casing to thereby limit the vertical movement of said guide sleeve.

6. A cooking apparatus according to claim 3 wherein said movable plate is provided with an opening in the shape of a circular hole superimposed on a slot, the upper portion of said connecting rod being passed through said slot so that a neck portion thereof is disposed at the circular hole, said connecting rod being rotated to be disposed at right angles with said slot for engagement with said movable plate, said slot being covered by said permanent magnet.

7. A cooking apparatus according to claim 3 wherein said operating lever is provided with an opening in the shape of a circular hole superimposed on a slot at the end remote from the operating portion, a neck portion being formed at the lower end of said connecting rod, said lower end of said connecting rod being passed through said slot until a neck portion thereof is disposed at the circular hole, said connecting rod being rotated to be disposed at right angles with said slot for engagement with said operating lever.

8. A cooking apparatus according to claim 3 wherein said operating lever is provided with a Y-shaped hole at the end remote from the operating portion, a U-shaped mounting portion of a shape corresponding to the shape of said hole being formed at the lower end of said connecting rod, said mounting portion being passed through said hole and straightened for engaging said connecting rod with said operating lever.

9. A cooking apparatus comprising a vessel containing food to be cooked, heater means for heating said vessel, a circuit for energizing said heater and including a switch therein, a heat-actuated device for actuating a switch therein to an open condition when the temperature of said vessel rapidly rises, said heat-actuated device comprising a casing, a heat-conductive plate, said vessel resting on said plate, one end of said casing being attached to said heat-conductive plate opposite said vessel, the opposite end of said casing being closed by a bottom plate having a guide opening therein, at least one substantially rectangular ferrite element having a Curie point near said raised temperature mounted on said heat-conductive plate, a movable plate disposed within said casing and having an operating rod operatively connected to said switch, at least one substantially rectangular permanent magnet mounted on said movable plate in opposition to said ferrite element, a spring means disposed between said heat-conductive plate and said movable plate and an adjusting plate loosely and rotatably supported on said casing, said adjusting plate being provided with a guide rod extending through guide openings in said resilient plate and said movable plate for guiding the vertical movement of the latter, said adjusting plate having a hole therein permitting passage therethrough of a means for rotating said movable plate to thereby control the opposing areas of said permanent magnet and said ferrite element.

10. A cooking apparatus comprising, in combination, a vessel for containing food to be cooked, heater means for heating said vessel, a heating circuit for energizing said heater including a switch, a heat-actuated device for actuating said switch to an open condition when the temperature of said vessel rises rapidly, a heating plate having said heater means therein and a casing depending therefrom, said heat-actuated device comprising a guide sleeve disposed within said casing depending from said heating plate, said sleeve having legs extending from the lower end thereof through openings provided in a bottom portion of said casing to limit the movement of said guide sleeve relative to said casing, at least one ferrite element attached to the under surface of a heat-conductive plate mounted on the upper end of said guide sleeve, said ferrite element having a Curie point near the raised temperature of said vessel, a movable plate movably mounted within said sleeve, a permanent magnet, said movable plate being provided with an opening in the shape of a circular hole superimposed on a slot, a connecting rod the upper portion of which is passed through said slot so that a neck portion thereof is disposed in the circular hole, said connecting rod being rotated so as to be at right angles with said slot for engagement with said movable plate, said permanent magnet being mounted on said movable plate on the opposite side relative to said rod and covering said slot, a spring disposed between said heat-conductive plate and said movable plate, an operating lever connected to the lower end of said connecting rod, said rod transmitting movement of said operating lever to said movable plate, a movable contact carrier plate, means on said operating lever to manipulate said contact carrier plate, a stationary contact carrier plate adjacent to said movable contact carrier plate, both said contact carrier plates being mounted on a pin of a plug socket, one of said carrier plates being electrically insulated from said pin, and a terminal strip for lead wires to said heating circuit fitted to said insulated carrier plate.

References Cited

UNITED STATES PATENTS

| | | | |
|---|---|---|---|
| 1,675,680 | 7/1928 | White | 200—88.6 |
| 2,339,087 | 1/1944 | Mantz | 200—88 X |
| 2,611,069 | 9/1952 | Frazier | 219—441 X |
| 2,657,299 | 10/1953 | McNairy | 219—441 |
| 2,663,785 | 12/1953 | Graham | 219—495 |
| 2,751,483 | 7/1956 | Keen et al. | 200—88.6 X |
| 3,009,047 | 11/1961 | Simmons | 219—495 |
| 3,015,710 | 1/1962 | Kelly | 219—450 |

FOREIGN PATENTS 780,158  7/1957  Great Britain.

ANTHONY BARTIS, *Primary Examiner.*

RICHARD M. WOOD, *Examiner.*